United States Patent Office 3,528,936
Patented Sept. 15, 1970

3,528,936
STABILIZED COMPOSITIONS OF INTERPOLYMERS OF BUTADIENE POLYMERS AND POLYUNSATURATED POLYESTERS
Eric G. Kent and Hector Lazzarotto, Sarnia, Ontario, Canada, assignors to Polymer Corporation Limited, Sarnia, Ontario, Canada, a body corporate and politic
No Drawing. Filed Nov. 21, 1966, Ser. No. 595,571
Claims priority, application Canada, Dec. 17, 1965, 947,993
Int. Cl. A63b *37/00;* C08c *11/00*
U.S. Cl. 260—23.7      7 Claims

ABSTRACT OF THE DISCLOSURE

A cross-linked elastic material having improved stability to ageing is prepared by interpolymerizing a polymer of butadiene and 10–100 parts by weight per 100 parts of polymer of a polyester having at least two independently polymerizable ethylenically unsaturated groups in the presence of a small amount of an oil soluble polar additive. Representative example of such additive is zinc stearate.

The cross-linked material is suitable for use in molded goods such as golf balls.

---

This invention relates to an elastic composition formed by polymerizing an unsaturated polyester in the presence of a butadiene polymer. In particular, it relates to a homogeneous elastic composition formed by free radical-induced interpolymerization of polybutadiene and a polymerizable polyester in the presence of an oil soluble polar additive, and to products made therefrom.

In the preparation of rubber goods such as tires, butadiene polymers are compounded with carbon black and then vulcanized, that is, heated with sulfur and accelerators to produce crosslinks between chain-like polymeric molecules. It is known that butadiene polymers can also be crosslinked by heating with peroxides. The resulting elastic materials, however, are unstable and the stability cannot be improved by the introduction of polymerizable poly-functional monomers such as divinyl benzene or polyesters. When aged under normal conditions of use, these materials harden, become brittle and lose utility in most applications in which a degree of rubber elasticity is required.

It is the object of this invention to improve ageing resistance of butadiene polymers interpolymerized with poly-functional monomers. Another object is to provide a homogeneous elastic material having an improved resistance to ageing. Yet another object is to provide a process of producing elastic articles such as moulded golf balls based on said material having improved resistance to ageing.

It has now been discovered that a polymeric composition containing a butadiene polymer such as cis-1,4 polybutadiene and a polyester having at least two independently polymerizable groups such as glycol diester of methacrylic acid, can be uniformly interpolymerized in the presence of a small amount of an oil soluble polar additive such as zinc stearate and if desired, an antioxidant, to produce homogeneous, essentially crosslinked elastic material having improved resistance to ageing.

In accordance with the invention, a polymeric composition is provided which is capable of interpolymerizing to produce a crosslinked, elastic material having a resistance to ageing, which composition comprises a mixture of (1) a polymer butadiene, (2) a polyester having 2–4 ester groups and at least two independently polymerizable ethylenically unsaturated groups, and (3) an oil soluble polar additive, the said mixture containing per 100 parts by weight of (1) about 0.5 to 5.0 parts of (3).

In a specific embodiment, the invention provides a polymeric composition which comprises a mixture of (1) a rubbery polymer of butadiene having at least 85 percent of the butadiene units in the 1,4 structure, (2) 30 to 80 parts of a polyester having 2–4 ester groups and at least two independently polymerizable ethylenically unsaturated groups, (3) 1 to 3 parts of a polyvalent metal salt of a carboxylic acid containing 12–24 carbon atoms, (4) 30 to 80 parts of a filler having an average particle size of less than 0.1 micron, (5) about 0.5 to 3 parts of an organic peroxy compound, and (6) about 0.5 to 2 parts of an antioxidant, said parts being parts by weight per 100 parts of said polybutadiene (1). The above mixture is prepared at a temperature at which the half life of the peroxy compound (5) is greater than 10 hours, shaped and then heated at a temperature at which the half life of said compound (5) is less than 10 minutes, whereby said polybutadiene (1) and said polyester (2) interpolymerize to produce a crosslinked, elastic material having a resistance to ageing. When shaped and heated in a spherical golf ball mould, a moulded golf ball is produced which surpasses conventional wound golf ball in cut resistance and stability to ageing at elevated temperature.

The butadiene polymer which constitutes a substantial proportion of the composition is a high molecular weight rubbery millable polymer of butadiene-1,3. It may be either a homopolymer or a copolymer with a minor proportion, preferably less than 30 mole percent on the total polymer, of a copolymerizable monomer such as isoprene or styrene. A polybutadiene however, is preferred when a high resilience of the crosslinked composition is desired. The polymer of butadiene has at least 85 percent of monomer units in the 1,4 structure and is produced in the presence of organo-metallic catalysts. The best results are obtained with polybutadiene having predominantly cis-1, 4 configuration. The butadiene polymer can be used also in blends with up to 20 percent by weight of hydrocarbon polymers such as polyisoprene or high styrene-butadiene copolymer.

The second component of the composition is a polyester having 2 to 4 ester groups and at least two independently polymerizable, ethylenically unsaturated groups. The term "polyester" includes di-, tri- and tetra-esters of polyhydric alcohols with unsaturated carboxylic acid as well as polyesters of polybasic acids with unsaturated alcohols. The polyester contains at least two carbon-to-carbon double bonds which are separated by at least one carbon atom and preferably are of the vinylidene type $>C=CH_2$. The preferred polyesters are non volatile liquids at temperatures at which they are mixed and contain 8 to about 20 carbon atoms, although those containing up to 28 carbon atoms can also be used. They act as plasticizers for the high molecular weight polymers of butadiene and are capable of polymerizing in the presence of free radical type catalysts. Examples of esters which can be used are those formed by reacting an unsaturated carboxylic acid having 3 to 6 carbon atoms such as acrylic, methacrylic, 3-butenoic, ethacrylic, or itaconic acid, with a polyhydric alcohol containing 2 to about 8 carbon atoms such as ethylene glycol, diethylene glycol, tetraethylene glycol, glycerol or pinacol in a proportion such that at least 2 ester groups are formed. It is also possible to use esters which are formed by reacting a polybasic carboxylic acid having 3 to 8 carbon atoms such as malonic, maleic, fumaric, itaconic, succinic, adipic or phthalic acid with an unsaturated alcohol such as vinyl alcohol, allyl alcohol, or 3-butenol. The best results are obtained with esters of methacrylic acid with glycols or glycerols such as ethylene glycol dimethacrylate, tetraethylene glycol dimethacrylate, or trimethylol propane trimethacrylate.

The third component of the composition of this invention is an oil soluble non-polymerizable organic compound having a polar group. The compound contains a large hydrocarbyl group with at least 8 and not more than 30 carbon atoms which is responsible for the solubility in hydrocarbons and miscibility with the polymer of butadiene. The polar group preferably is a carboxylate or sulphonate group having attached thereto an atom of di- or tri-valent metal such as Mg, Al, Zn, Ca, Ba. The polarity of the compound may also be provided by polar groups attached to the hydrocarbyl such as amide, or ester group, or ethoxylated chain of a length such that the oil solubility of the compound is maintained at temperatures of mixing and curing. The compound is non volatile and is believed to facilitate the mixing of the essentially non-polar polymer of butadiene with the polar polyester to a homogeneous mixture. It is also believed to enhance the interpolymerization reaction in that the two components, the butadiene polymer and the polymerizable ester, are uniformly exposed to the action of free radicals and produce optimum interpolymerization crosslinks between the components. In the absence of the above oil soluble organic compound, the interpolymerization is depressed and the elastic product obtained on curing is a heterogeneous mixture of crosslinked polymer of butadiene and crosslinked polymer of polyester with some crosslinked interpolymer which easily cracks and becomes brittle on ageing. Representative examples of the oil soluble organic compound are zinc stearate, aluminum oleate, magnesium abietate, zinc dodecyl sulphonate as well as other salts of polyvalent metals with other fatty and rosin acids containing 12–24 carbon atoms. The oil soluble additives may be formed by reacting metal oxide and the respective acid. For example, satisfactory results are obtained by adding stearic acid and zinc oxide instead of zinc stearate to the mixture of polybutadiene and dimethacrylate. In order to completely react the acid an excess of the metal oxide is used which then acts as a filler material.

The proportion of the polymerizable polyester may vary within wide limits ranging from about 10 to about 100 parts per 100 parts by weight of the butadiene polymer. A low proportion of the polyester is used when an extrudable composition is required which can be interpolymerized to produce a soft, flexible and elastic material suitable in the production of relatively soft rubber goods. A high proportion of the polyester is used where an abrasion resistant, hard rubber material is required. In the production of moulded goods which are moderately hard and elastic, it is preferred to use about 30 to 80 parts of the polyester per 100 parts by weight of the butadiene polymer. The oil soluble non-polymerizable compound is used in a relatively small amount ranging between about 0.5 and 5 parts, and preferably 1–3 parts, per 100 parts of the polymer.

The composition may also contain a filler material in an amount of up to about 200 parts, usually in the range of about 20 to 150 parts per 100 parts of the butadiene polymer. In the preparation of relatively hard, mouldable composition, about 30 to 80 parts per 100 parts of polymer of the filler is preferably used. It may be a reinforcing filler or a non-reinforcing one. The latter is used in relatively large amounts of about 100 parts and above. White inorganic fillers such as silica, aluminum silicate, calcium silicate having an average particle size of less than 0.1 micron are preferred, although coarser ones represented by clays, calcium carbonate, titanium dioxide, barium sulfate can be used with success. Carbon black can also be used, although for effective crosslinking it requires a high loading of a peroxide compound. Finely dispersed colouring pigments and buffering agents may be added as desired.

The stability to ageing of the above composition is further enhanced by the addition of less than 2 parts, preferably between 0.5 and 2 parts, per 100 parts of polymer of an antioxidant. The antioxidant is believed to trap and inactivate the residual free radicals that may be left after the interpolymerization step and to prevent further crosslinking and embrittling of the elastic material. Conventional rubber antioxidants can be used, for example aromatic secondary amines such as phenyl beta naphthyl amine (PBNA), di-para-octylated phenyl amine, aromatic diamines such as paraphenylene diamine, reaction products of aromatic amines with various ketones, alkyl substituted hydroquinones and alkyl phenols such as 2,2'-methylene bis (4 ethyl-6 tert butyl phenol). The non-discoloring types are preferred in white and light coloured compositions.

The composition of the invention is prepared by mixing the ingredients on an open mill or in an internal mixer to produce a homogeneous mixture. The mixture has a consistency which may range from the fluidity of a plastisol to a solid slightly elastic composition of unvulcanized rubber and can be easily shaped by casting, moulding or extruding at a temperature of about 40±25° C. When shaped, the mixture is subjected to the conditions at which the interpolymerization takes place. For this purpose it may be exposed to the irradiation of high energy free radical-inducing rays, or preferably a free radical source is admixed i nthe mixing step. Although it is possible to use any free radical producing substance such as barium peroxide, potassium persulphate, bis-azoisobutyronitrile, it is preferred to employ organic peroxides such as dicumyl peroxide, benzoyl peroxide, lauroyl peroxide, butyl perbenzoate, that have a half-life greater than 10 hours at the temperature of mixing and are easily miscible or dispersible in the mixture of butadiene polymer and polymerizable polyester. The mixed composition containing a peroxy compound is heated at a temperature at which the peroxy compound rapidly decomposes and has a half-life of less than 10 minutes, preferably less than 5 minutes. When dicumyl peroxide is used, the mixture which has been prepared and then shaped at about room temperature is heated at a temperature of at least 140° C. and preferably about 150–175° C. for a period of less than 100 minutes, preferably about 5 to 30 minutes. The amount of the peroxide is such that it is just sufficient to interpolymerize the mixture to a degree of crosslinking as desired at the selected heating conditions, and may range between about 0.5 and 3 parts of active peroxide per 100 parts of the polymer. Excessive amounts of peroxide are harmful, since they affect ageing stability of the crosslinked material. Any free radicals that may be left in the composition following the interpolymerization step are inactivated by the antioxidant that may be present in small amounts.

The temperature at which the composition is heated depends on the rate at which the polyester is polymerized relative to the rate of the crosslinking of the butadiene polymer. It is desired that both rates are fast and as close as possible so that an interpolymer is preferentially formed within about 5 minutes.

The crosslinked material produced from the above described composition is characterized by relatively high hardness, high elasticity and satisfactory stress-strain properties. It may be used as moderately hard rubber in applications where the presence of sulfur and/or carbon black is undesirable. For instance, it is suitable for use as flexible electrical insulation in direct contact with copper conductors, or as jacketing material for cables. Due to the excellent mouldability, the composition of this invention is suitable for use in the production of hard and unbreakable toys, sporting goods such as bowling balls and pins, decorative and functional moulded goods. A specific example of the type of goods for which the composition of this application is particularly adapted is moulded golf ball. It may be either a ball of uniform composition or if desired a composite ball consisting of a core based on the interpolymer of this invention and a shell, enveloping the core, of synthetic or natural trans-1,4 polyisoprene. The golf balls made of the crosslinked elastic material of this invention are equivalent in most respects to the conventional high quality golf balls which are made using a cumbersome procedure, and surpass them in stability to high temperature ageing and in cut resistance.

EXAMPLE 1

Polybutadiene having a Mooney viscosity (ML1+4 at 100° C.) of 40 and cis-1,4 content of 97 percent was compounded on a two-roll mill at about 25° C. using the following recipe.

| Compound 1: | Parts by weight |
|---|---|
| Polybutadiene (PBD) | 100 |
| Precipitated silica (av. size 0.02 micron) | 35 |
| Titanium dioxide (av. size 0.3 micron) | 10 |
| Zinc oxide | 5 |
| Phenyl beta naphthyl amine (PBNA) | 1 |
| Stearic acid | 1.75 |
| 1,3-butylene glycol dimethacrylate | 40 |
| Dicumyl peroxide (40%) | 4 |
| Triethanol amine | 1.0 |

On the addition of 1,3-butylene glycol dimethacrylate the compound became soft and very plastic so that the temperature of the milled stock remained low on milling barely above the ambient temperature. A portion of the compound was put in a mould and cured under pressure at 166° C. for 15 minutes to produce an elastic sheet 0.75 mm. thick. Several dumb-bell specimens were cut from the sheet and then aged at 40° C. and 150° C., respectively, for periods as shown in Table I. Stress-strain properties were determined using an Instron tensile tester at a jaw separation speed of 5 centimeters per minute.

Two control compounds were prepared under the conditions described for Compound 1. The composition differed from that of Compound 1 in that there were omitted PBNA and stearic acid in Control A and only stearic acid in Control B. Control A additionally contained 2 parts of ethylene glycol.

Stress-strain results in Compound 1 and both controls are shown in Table I.

TABLE I

| Ageing | | Compund 1 | | Control A | | Control B | |
|---|---|---|---|---|---|---|---|
| Temp. (° C.) | Time (hrs.) | Tensile strength (kg./cm.²) | Elongation (percent) | Tensile strength (kg./cm.²) | Elongation (percent) | Tensile strength (kg./cm.²) | Elongation (percent) |
| 150 | 0 | 111 | 60 | 70 | 30 | 123 | 60 |
| 150 | 2 | 127 | 60 | 58 | 15 | 55 | 30 |
| 150 | 8 | 111 | 80 | 42 | 15 | 62 | 15 |
| 150 | 24 | 57 | 25 | 49 | 15 | (¹) | |
| 40 | 48 | 128 | 60 | 84 | 25 | (²) | |
| 40 | 480 | 119 | 50 | 89 | 20 | (²) | |

¹ Brittle.
² Not tested.

Compound 1 retained its original tensile strength and elongation on ageing for 8 hours at 150° C. and at 40° C. for at least 20 days. The control compounds on the other hand showed a significant deterioration of these properties in 2 hours of ageing at 150° C.

48 gram portions of each of the milled and uncured compounds, Compound 1 and Control A were shaped into a sphere, placed in a cavity of a pre-heated golf ball mould and cured under pressure at 166° C. Compound 1 was cured for 30 minutes and Control A for 10 minutes. The cured balls were removed after the mould was cooled to room temperature, de-flashed and then tested for rebound, hardness, cut resistance, click and compression resistance.

The rebound was determined by dropping the ball from a height of about 1 meter onto a brass plate 2.5 cm. thick, and recording the height of the bounce, and expressed in percent of the original height. The hardness was measured using a Shore C durometer in a conventional manner. The cut resistance was assessed by dropping a 60° blade having a 1.6 mm. flat edge and weighing 3.6 kg. from a height of 86 cm. on the ball, positioned 1 cm. off centre of the path of the blade, and then measuring the length and depth of the cut. When it was desired to measure the durability of the ball, the blade was repeatedly dropped until the ball split or chipped open. The conventional good grade golf ball does not pass this test and usually splits open on the first drop of the blade.

The click is a subjective criterion of the quality of golf balls used by discriminating golfers. It is an audible response from the striking of the ball with a golf club and it may be sharp or dull or intermediate between sharp and dull as expected in a good quality ball.

The compression resistance is measured using a tester consisting of an upper platen attached through a calibrated spring to a dial gauge, and a lower platen driven by a geared handle. When a golf ball is placed on the lower platen, the handle is drawn forward raising the ball in contact with the upper platen. This compresses the spring and drives the dial gauge. The dial gauge begins to record when a preload is applied to the ball resulting in an initial deflection of 2.5 mm. One compression point on the dial (USGA compression point) is equal to a deflection of 0.025 mm. in the ball after the pre-load has been applied. A force of 113.5 kg. is required to compress the spring. The tester is used by the U.S. Golf Association to rate the compression resistance of golf balls. A high quality golf ball has a USGA compression range from about 75 to 110 points and a driving range type ball falls between 25 and 35 points.

The results of the golf ball testing are shown in Table II.

a sheet, 0.75 mm. thick. Several dumb-bell specimens were cut from the cured sheet, each of the specimens was aged

TABLE II

|  | Compound | | Control A | | Conventional high quality golf ball (control), unaged |
|---|---|---|---|---|---|
|  | Unaged | Aged 4 hrs. at 150° C. | Unaged | Aged 4 hrs. at 150° C. |  |
| Hardness (Shore C) | 80 | 80 | 82 | 82 | 75 |
| Rebound (percent) | 72 | 72 | 72 | 72 | 70 |
| Number of cuts to failure | 21 | 22 | 21 | 1 | 1 |
| Click | Good | Good | Good | Excellent | Excellent |
| USGA compression (point) | 75 | (¹) | 75 | (¹) | 63 |

¹ Not tested.

Table II shows that the golf ball made from Compound 1 is in most respects better than the conventional ball and considerably better in cut resistance than either of the two control balls. The conventional golf ball was not aged at 150° C. since it was unstable at temperatures as low as about 70° C.

Similar stress-strain properties were obtained when the silica filler in Compound 1 was replaced by equal amount of calcium silicate having an average particle size of 0.03 micron (available under the trademark Silene EF). Coarser fillers such as calcined hard clay (available under the trademark Whitetex #2) and hydrated aluminum silicate (available under the trade name McNamee Clay) used in an amount of 35 parts instead of the silica of Compound 1 produced softer materials which had a higher rebound and a lower tensile strength than Compound 1. An additional compound was made in which the silica and titanium dioxide of Compound 1 were omitted. On curing at 166° C. it produced a crosslinked material showing a Shore C hardness of 55 and a ball rebound of 77%.

EXAMPLE 2

Three golf balls were prepared using the procedure and the recipe as described in Example 1 except that the cis-1,4 polybutadiene was replaced by:

(1) A polybutadiene (PBD) having 90 percent of units in the 1,4 structure and a cis-1,4 content of 35 percent and a Mooney viscosity (ML1+4 at 100° C.) of 55;

(2) A 90/10 mixture of the cis-1,4 polybutadiene and trans-1,4 polyisoprene having a Mooney viscosity of 25; and (3) A styrene-butadiene emulsion copolymer (SBR) having a Mooney viscosity (ML1+4 at 100° C.) of 52.

The cured balls were tested as described in Example 1 and test results are presented in Table III.

TABLE III

| Compound No. | Polymer | Hardness (Shore C.) | Rebound (percent) | Click | USGA compression |
|---|---|---|---|---|---|
| (1) | PBD 35% cis | 80 | 67 | Good | >75 |
| (2) | 90/10 mixture | 79 | 73 | Good | 76 |
| (3) | SBR control | 80 | 31 | Very sharp | 75 |

Table III shows that good quality balls can be made from compounds based on polybutadiene of 35 percent cis content and the mixture of polybutadiene with a minor amount of trans-1,4 polyisoprene. The styrene-butadiene emulsion copolymer produced a ball having a satisfactory hardness and compression resistance, but a low rebound and a sharp click.

EXAMPLE 3

Three compounds were prepared using the procedure and the recipe of Example 1 except for the 1,3-butylene glycol dimethacrylate which was replaced by:

(a) ethylene glycol dimethacrylate,
(b) tetraethylene glycol dimethacrylate, and
(c) trimethylol propane trimethacrylate, respectively.

The compound containing (a) was moulded and cured for 30 minutes at 166° C. to form three golf balls and at 150° C. as indicated in the following table and then tested. The golf balls were also aged as indicated in the table below. The compound containing (b) was moulded and cured to form a golf ball which was tested without ageing. The third compound was cured to form a sheet 0.75 mm. thick from which several dumb-bell specimens were cut, each specimen was aged at 150° C. for a period as shown in the table and then tested.

The results are shown in Table IV.

TABLE IV

| Ageing Time at 150° C. (hours) | 0 | 4 | 24 |
|---|---|---|---|
| Compound 1 (with ethylene glycol dimethacrylate): | | | |
| Tensile strength (kg./cm.²) | 84 | 77 | 42 |
| Elongation (percent) | 40 | 40 | 4 |
| Hardness (Shore C) | 77 | 79 | 79 |
| Ball rebound (percent) | 70 | 70 | 70 |
| Cut resistance—length of cut (mm.) | 25 | 27 | 28 |
| Cut resistance—depth of cut (mm.) | 0.05 | 0.10 | 0.15 |
| Number of cuts to failure | 7 | 8 | 9 |
| Compound 2 (with tetraethylene glycol dimethacrylate): | | | |
| Hardness (Shore C) | 79 | (¹) | (¹) |
| Ball rebound (percent) | 78 | (¹) | (¹) |
| Cut resistance—length (mm.) | 25 | | |
| Cut resistance—depth (mm.) | 1.25 | | |
| Compound 3 (with trimethylol propane trimethacrylate): | | | |
| Tensile strength (kg./cm.²) | 112² (117) | 110 | 54 |
| Elongation (percent) | 60² (35) | 50 | 30 |

¹ Not tested.
² Values obtained after 20 day ageing at 40° C.

The above table indicates that the stress-strain properties of the cured Compounds 1 and 3 are satisfactory and do not significantly change in 4 hour ageing at 150° C. Golf balls made from Compounds 1 and 2 also show satisfactory hardness, rebound and cut resistance.

EXAMPLE 4

Four compositions were prepared using the recipe of Compound 1 of Example 1 except for the stearic acid and zinc oxide which were replaced by the components shown in the table below. Compositions 1 to 3 were moulded to form a sheet 0.75 mm. thick and cured for 10 minutes at 166° C. Dumb-bells cut from the sheet were aged at 150° C. for periods as shown in Table V and then tested for stress-strain properties. Compositions 2 and 4 were moulded to form a golf ball, cured for 10 minutes at 204° C. and 65 minutes at 166° C., respectively, and tested before and after 4 hour ageing at 150° C. using the procedures described in Example 1. Test results are shown in Table V.

Table V shows that compositions 1 to 3 are stable to ageing at 150° C. for 8 hours and practically retain their original stress-strain properties. Golf balls prepared from compositions 2 and 4 showed a good retention of hardness and rebound and excellent cut resistance on 4 hour ageing at 150° C.

The golf balls made from these two compounds showed a rebound of 74.5 and 73 percent, respectively, and had

TABLE V

| | Composition | | | |
|---|---|---|---|---|
| | 1 | 2 | 3 | 4 |
| Recipe variables (in parts per 100 parts PBD): | | | | |
| ZnO | 5.0 | | 5.0 | 5.0 |
| MgO | | 5.0 | | |
| Rosin acid [1] | | 1.75 | | |
| Sulphonic acid [2] | 1.75 | | | |
| Dilauryl ester [3] | | | 1.75 | 2.5 |

| | Tests | | | | | | | | | | | |
|---|---|---|---|---|---|---|---|---|---|---|---|---|
| | Tensile strength, Kg./cm.² | Elongation, percent | Tensile strength, Kg./cm.² | Elongation, percent | Hardness, Shore C | Ball rebound, percent | Cut resistance [4] | Tensile strength, Kg./cm.² | Elongation, percent | Hardness, Shore C | Ball rebound, percent | Cut resistance |
| Ageing time: | | | | | | | | | | | | |
| 0 hours at 150° C | 102 | 50 | 133 | 70 | 81 | 72 | ([5]) | 128 | 50 | 77 | 72 | ([5]) |
| 4 hours at 150° C | 97 | 50 | 122 | 60 | 83 | 72 | 9 | 131 | 50 | 76 | 74 | 19 |
| 8 hours at 150° C | 84 | 30 | 109 | 45 | ([5]) | ([5]) | ([5]) | 126 | 50 | ([5]) | ([5]) | ([5]) |
| 20 days at 40° C | ([5]) | ([5]) | ([5]) | ([5]) | ([5]) | ([5]) | ([5]) | 128 | 45 | ([5]) | ([5]) | ([5]) |

[1] Disproportionated abietic acid (Resin 731D).
[2] Dodecyl benzene sulphonic acid.
[3] Di-laurylthio dipropionate.
[4] Number of cuts to failure.
[5] Not tested.

EXAMPLE 5

Two compounds were prepared using the recipe and the compounding procedure of Example 1 except for the stearic acid which was increased from 1.75 parts to 2.0 parts and the 1,3 butylene glycol dimethacrylate which was used in amounts of 20 and 70 parts, respectively, instead of 40 parts. Each of the compounds was moulded and pressure cured at 166° C. for 20 minutes to produce a golf ball and two sets of specimens for testing stress-strain properties, hardness and modulus of elasticity. One set was aged at 150° C. for 16 hours before testing and the other was tested unaged. Stress-strain properties were tested using an Instron tester at a jaw separation speed of 25 cm./min. The results are presented in Table VI.

TABLE VI

| | Compound | | | |
|---|---|---|---|---|
| | 1 | | 2 | |
| | 1,3 butylene glycol dimethacrylate (parts) | | | |
| | 20 | | 70 | |
| | Unaged | Aged | Unaged | Aged |
| 20% modulus (kg./cm.²) | 22.5 | 20.0 | 100 | 90.8 |
| 50% modulus (kg./cm.²) | 48.9 | 44.3 | | |
| Tensile strength (kg./cm.²) | 100 | 80.8 | 146 | 107 |
| Elongation (percent) | 100 | 90 | 40 | 30 |
| Modulus of elasticity (kg./cm.²) | 195 | 199 | 555 | 565 |
| Hardness (Shore C) | 50 | 51 | 64 | 72 | a good-to-excellent click. The compression resistance of the ball containing higher loading of the methacrylate was 89 USGA compression points. The ball made from Compound 1 was considerably softer and showed a resistance of 38 USGA compression points.

EXAMPLE 6

Four compounds were prepared with different amounts of peroxide and antioxidant using the compounding procedure of Example 1. The compounding recipe was as follows:

| | Parts by weight |
|---|---|
| Cis-1,4 polybutadiene | 100 |
| Precipitated silica (av. size 0.02 micron) | 35 |
| Titanium oxide (av. size 0.3 micron) | 10 |
| Zinc oxide | 5 |
| Stearic acid | 2 |
| 1,3 butylene glycol dimethacrylate | 20 |
| Antioxidant 2246 [2,2'-methylene-bis(4-ethyl-6-tertiary butyl phenol)] | Variable |
| Dicumyl peroxide (40%) (DICUP) | Variable |

The compounds were moulded and cured under pressure at 166° C. for 20 minutes to produce two sets of specimens for testing stress-strain properties, hardness and modulus of elasticity. One set was aged for 16 hours at 150° C., while the other set was unaged, that is, stored for 16 hours at room temperature. Both sets were tested under the conditions as described in Example 5 and the results are presented in Table VII.

TABLE VII

| | Compound | | | | | | | |
|---|---|---|---|---|---|---|---|---|
| | 1 | | 2 | | 3 | | 4 | |
| | 2246 (parts) | | | | | | | |
| DICUP (parts) | 0 3 | | 1 6 | | 1 3 | | 2 3 | |
| | Unaged | Aged | Unaged | Aged | Unaged | Aged | Unaged | Aged |
| 20% modulus (kg./cm.²) | 48 | ([1]) | 32 | 34 | 23 | 20 | 19 | 17 |
| 50% modulus (kg./cm.²) | | ([1]) | 75 | | 49 | 44 | 40 | 39 |
| Tensile strength (kg./cm.²) | 76 | ([1]) | 86 | 68 | 100 | 81 | 86 | 72 |
| Elongation (percent) | 40 | ([1]) | 60 | 40 | 100 | 90 | 120 | 120 |
| Modulus of elasticity (kg./cm.²) | 306 | 478 | 254 | 231 | 195 | 199 | 149 | 132 |
| Hardness (Shore C) | 64 | 67 | 57 | 58 | 50 | 51 | 45 | 47 |
| Gel (percent) [2] | 98 | ([3]) | ([3]) | ([3]) | ([3]) | ([3]) | 97 | ([3]) |
| Swelling index (percent) [2] | 1.8 | ([3]) | ([3]) | ([3]) | ([3]) | ([3]) | 2.4 | ([3]) |
| Swelling in ASTM #3 oil (percent) [4] | ([3]) | ([3]) | ([3]) | ([3]) | ([3]) | ([3]) | 56 | ([3]) | 64 | ([3]) |

[1] Brittle.
[2] Determined in toluene at room temperature.
[3] Not tested.
[4] Determined after 24 hours immersion in ASTM #3 oil at 100° C.

Table VII shows that the stability to ageing of cured compounds is greatly improved in the presence of 1 part after ageing for 8 hours at 150° C. The results are shown in Table VIII.

TABLE VIII

|  | Ball | | | | | |
|---|---|---|---|---|---|---|
|  | 1 | | 2 | | 3 | |
|  | Filler (parts/100 parts polymer) | | | | | |
| Ground CaCO₃ (Pulpro White) | 70 | | 140 | | 70 | |
| Precipitated silica |  | | | | 35 | |
|  | Unaged | Aged | Unaged | Aged | Unaged | Aged |
| Hardness (Shore C) | 65 | 65 | 68 | 70 | 75 | 75 |
| Rebound (percent) | 67.5 | 67.5 | 58.5 | 58.5 | 59.5 | 59.7 |
| Click | Fair | Fair | Fair | Fair | Good | Good |
| Cut resistance: |  |  |  |  |  |  |
| Cut length (mm.) | (¹) | 28 | (¹) | 35 | (¹) | 33 |
| Cut depth (mm.) | (¹) | 1.3 | (¹) | 2.5 | (¹) | 1.3 |
| Number of cuts to failure | (¹) | 10 | (¹) | 7 | (¹) | 18 |

¹ Not tested.

or more of Antioxidant 2246. It also shows that as the proportion of dicumyl peroxide to the antioxidant decreases, modulus and hardness of the elastic materials decrease and elongation increases. High gel and low swelling linked with the dimethacrylate. The low values of swelling index values indicate that cis-1,4 polybutadiene is crosslinked with the dimethacrylate. The low values of swelling in ASTM #3 oil show that the compound can be used where oil resistance is required.

Similar results were obtained, when the Antioxidant 2246 was replaced by symmetrical beta-naphthyl paraphenylene diamine and 4,4'-methylene bis (2,6 di-terbutyl phenol), respectively. The golf balls made from compounds containing the above antioxidants showed good cut resistance before and after ageing at 150° C. for 4 hours and did not chip or split open when struck 10 times with the 3.6 kg. cutting blade in the manner described in Example 1.

EXAMPLE 7

In this experiment two golf balls were prepared each consisting of a solid core with a cover affixed thereto. The solid core was prepared in the formulation and manner of Example 1 except that the amount of dimethacrylate compound was 30 parts per 100 parts of cis-1,4 polybutadiene. The first core was chilled to harden, wound concentrically with cotton string, then warmed at room temperature and cured at 166° C. for 15 minutes. The second core was cured at 166° C. for 15 minutes and then coated with an adhesive contact cement sold under the trademark Ten Bond by the Minnesota Mining and Manufacturing Company. Cover shells were prepared by mixing 10 parts of titanium dioxide into 100 parts by weight of a trans polyisoprene having a trans content of over 95 mole percent. A pair of cover shells was then placed on each of the core specimens, the two golf ball assemblies placed in a heated mould under pressure for 5 minutes at 121° C. The mould and contents were cooled while still under pressure, and then the golf balls removed. On testing, the following results were obtained:

|  | Ball A | Ball B |
|---|---|---|
| Shore C hardness | 70 | 78 |
| Rebound (percent) | 69 | 72 |
| Click | Good | Good |
| Cover Adhesion | Good | Good |

EXAMPLE 8

Three golf balls were prepared using the recipe of Compound 1 of Example 1 except for the silica and titanium dioxide which were replaced by the fillers indicated in the table below. The golf balls were mould cured for 10 minutes at 166° and tested unaged and then again Table VIII shows that Ball 2 containing 140 parts of filler per 100 parts of polybutadiene is fairly good and shows a satisfactory cut resistance after 8 hour ageing at 150° C.

What is claimed is:

1. In a polymeric composition capable of interpolymerizing to produce cross-linked elastic material which comprises a mixture of (1) a polymer of butadiene having at least 85 percent of the butadiene units in the 1,4 structure and (2) 10–100 parts of a polyester having at least two independently polymerizable ethylenically unsaturated groups and 2 to 4 ester groups, the addition of (3) about 0.5–5.0 parts of an oil soluble polar additive selected from the group consisting of polyvalent metal salts of carboxylic acids containing 12–24 carbon atoms, the said parts being parts by weight per 100 parts of polymer (1).

2. The composition according to claim 1 in which the polymer of butadiene is a rubbery polybutadiene having predominantly cis-1,4 configuration.

3. The composition according to claim 1 in which the polyester is an ester of methacrylic acid and a polyhydric alcohol.

4. The composition according to claim 1 in which the metal salt is zinc stearate.

5. The composition according to claim 1 which also contains between 0.5 and 2.0 parts by weight per 100 parts of (1) of a rubber antioxidant.

6. The composition according to claim 1 which also contains 20–150 parts per 100 parts of (1) of an inorganic filler having an average particle size of less than 0.1 micron.

7. The composition according to claim 1 which also contains between 0.5 and 2.0 parts of a rubber antioxidant and 20–150 parts of an inorganic filler having an average particle size of less than 0.1 micron, the parts being parts by weight per 100 parts of (1).

References Cited

UNITED STATES PATENTS 2,084,386   6/1937   Crawford _____ 260—23
3,274,148   9/1966   Sparks et al. _____ 260—41.5

OTHER REFERENCES

Maurice Morton: "Introduction to Rubber Technology," pp. 221–222 (1959).

Materials and Compounding Ingredients for Rubbers and Plastics by Rubber World (cited as Compounding), p. 124.

DONALD E. CZAJA, Primary Examiner

D. J. BARRACK, Assistant Examiner

U.S. Cl. X.R.

260—23.5, 27, 30.8, 41.5, 45.9, 45.95, 879; 273—58